United States Patent [19]
Haraikawa

[11] 3,944,028
[45] Mar. 16, 1976

[54] DISC BRAKE AND ACTUATOR ASSEMBLY STRUCTURE

[75] Inventor: Tetsuo Haraikawa, Funabashi, Japan

[73] Assignee: Tokico Ltd., Japan

[22] Filed: Aug. 12, 1974

[21] Appl. No.: 496,857

[30] Foreign Application Priority Data
Aug. 20, 1973   Japan.............................. 48-93143

[52] U.S. Cl. ....................... 188/72.5; 92/52; 92/75; 92/117 A; 92/DIG. 1; 188/370
[51] Int. Cl.² ...................................... F16D 55/228
[58] Field of Search ......... 188/72.5, 73.4, 370, 361, 188/72.4; 92/52, 75, 117 A, DIG. 1

[56] References Cited
UNITED STATES PATENTS

| | | | |
|---|---|---|---|
| 2,835,351 | 5/1958 | Armstrong et al.............. | 188/370 X |
| 3,675,742 | 7/1972 | Thompson...................... | 188/370 X |
| 3,844,384 | 10/1974 | Toshido et al..................... | 188/72.5 |

*Primary Examiner*—George E. A. Halvosa
*Attorney, Agent, or Firm*—Wenderoth, Lind & Ponack

[57] ABSTRACT

A disc brake assembly comprises a housing affixed to a non-rotatable member and having a through-hole therein. A cylinder is slidably fitted in the through-hole in the housing and has a pressure oil inlet, and a piston therein in sliding relation therewith. A disc is rotatable together with a rotating member, and a yoke is affixed to the cylinder and is movable with the cylinder. A member movably couples the yoke to the housing. A first friction pad is supported by the yoke and is adapted to be urged against or detached from one side of the disc, and a second friction pad is mounted on one end of the piston and is adapted to be urged against or detached from the other side of the disc.

4 Claims, 3 Drawing Figures

DISC BRAKE AND ACTUATOR ASSEMBLY STRUCTURE

BACKGROUND OF THE INVENTION

1. Field of the invention

This invention relates to improvements in fixed-housing type disk brakes.

By the term "fixed-housing type disk brake" is meant the type of disk brake in which a friction pad drive mechanism including a cylinder and a piston is placed in a housing affixed to a non-rotatable member of a vehicle.

2. Description of the prior art

In one kind of fixed-housing type disk brake previously known, two pistons are provided in opposed relation to each other within a housing affixed to a non-rotatable member of a vehicle, one of the pistons being designed to directly act on a first friction pad positioned between the piston and the disk, while the other piston is designed to act on a second friction pad positioned on the side opposite the first friction pad with respect to the disk. The disk brake of this type is advantageous in that it affords good vibration resistance because the floating member weighs less, but it suffers from disadvantage that it has a long dimension in a direction at a right angle to the disk, because two pistons are housed in the housing. Also, there is a problem in that there results an appreciable increase in the extent of the piston being returned through the medium of a friction pad, due to the spinning of the disk, i.e., the so-called knock-back extent of a piston.

SUMMARY OF THE INVENTION

The present invention is directed to eliminating the shortcomings experienced with the prior art fixed-housing type disk brake. According to the present invention, there is provided a disk brake in which a cylinder is provided in a housing in sliding relation thereto, the housing being affixed to a non-rotatable member of a vehicle, such as a wheel supporting member, a piston is fitted in the cylinder in sliding relation thereto, whereby the cylinder and the piston may move in opposite directions to each other but relative to the housing. Braking is effected by bringing the friction pads mounted on the cylinder and piston, respectively, into pressing contact with the opposite surfaces of a disk. According to the present invention, there is provided a disk brake which only requires a single set of a cylinder and piston rather than the provision of a pair of cylinders and pistons which are provided in opposed relation to each other, thereby rendering the size of the disk brake compact.

These and other objects and features of the present invention will be apparent from a consideration of the remaining part of the specification taken in conjunction with the accompanying drawings which indicate the preferred embodiments of the present invention.

DESCRIPTION OF THE PREFERRED EMBODIMENTS

Figure 1:
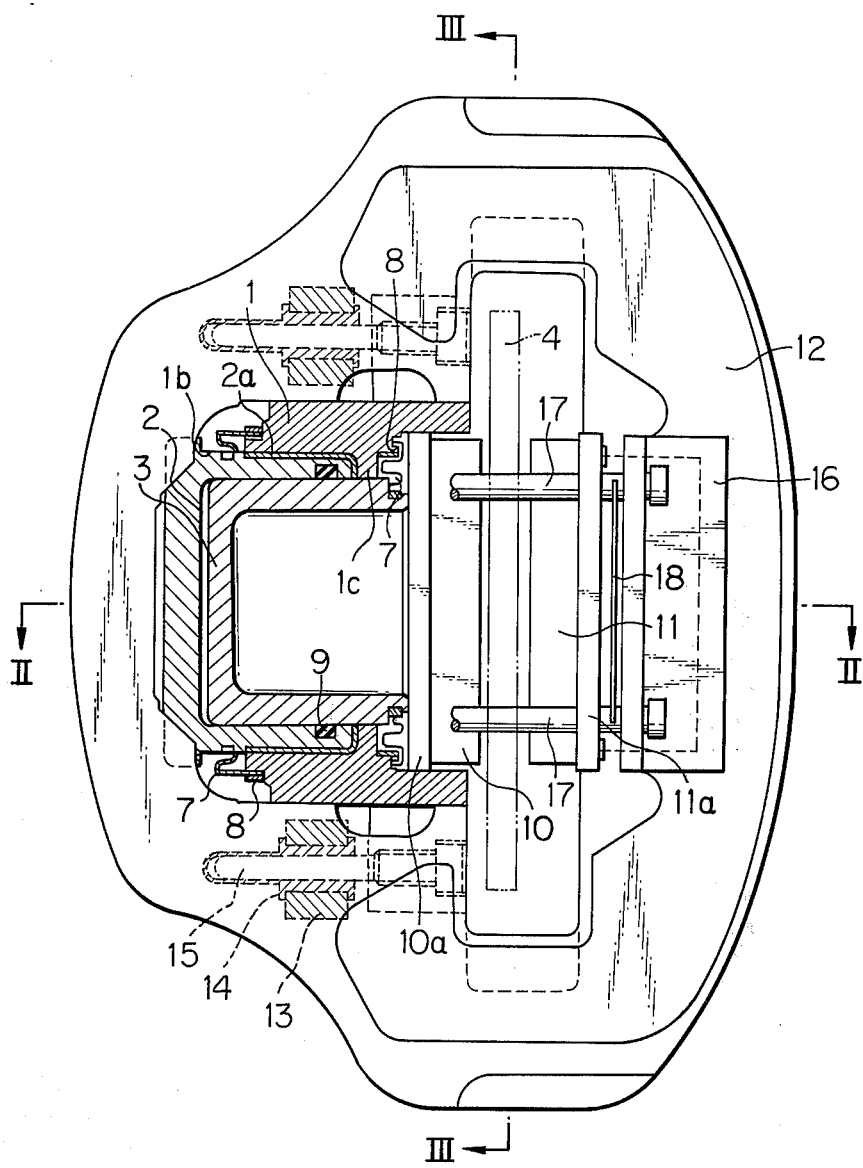
FIG. 1 is a plane view of one embodiment of the present invention, with the essential part thereof shown broken.

The drawings show housing 1 which is provided with an attaching portion 1a for a wheel supporting member and a through-hole. The through-hole is formed with a large diameter portion 1b and a small diameter portion 1c, with a cylinder 2 being fitted in the large diameter portion 1b in sliding relation thereto. A pressure oil inlet 2b is provided in the outer end of the cylinder 2, i.e., in a bottom portion 2c. Fitted on the outer peripheral surface of the cylinder which contacts the large diameter portion of the through-hole in the housing is a bushing 2a made of a material for preventing sticking between the above two contacting surfaces as well as for enhancing the lubricating effect, such as for instance, made of polytetrafluoroethylene (Trademark: Teflon). Slidingly fitted within the cylinder is a piston 3, whose one end extends through the small diameter portion 1c of the through-hole in the housing and projects outwardly from the housing. Numeral 4 designates a disk, and 5 and 6 are a breather and a breather cap, respectively. In FIG. 1 boot 7 and its retainer 8 are for preventing the ingress of mud or dust into the sliding portions of cylinder 2 and piston 3.

Provided in front of the piston 3 but in opposing relation to the opposite surfaces of the disk 4 are friction pads 10 and 11 which effect the braking action by being urged against the opposite surfaces of the disk 4. 12 is a flat yoke. A pair of collars 13 are integrally coupled to the opposite sides of the device and each have a resilient gripper 14 inserted therein. On the other hand, a pair of guide pins 15 are affixed to the housing 1, and the guide pins 15 slidingly engage the through-holes in the gripper 14. The axial lines of the guide pin 15 and the through-hole in the gripper 14 are in parallel with the axial line of the through holes 1b and 1c in the housing and those of the cylinder 2 and piston 3, and thus yoke 12 may slide in the same direction as such members. L-shaped bracket 16 is rigidly provided on the yoke 12. Extending between the bracket 16 and the cylinder 2 in parallel are two guide pins 17, which are also in parallel with the axial line of the cylinder. Accordingly, both the cylinder 2 and the yoke 12 may move together. The friction pads 10 and 11 are mounted on seat plates 10a and 11a, respectively, while the guide pins 17 extend through the seat plates 10a and 11a, thereby rigidly fixing the seat plates 10a and 11a in position. The seat plate 10a may follow the movement of the piston 3, while the seat plate 11a may follow the movement of the cylinder 2. In passing, shown at 18 and 19 are a retaining pin for guide pin 17 and a pin adapted to rigidly fix the seat plate 11a on the guide pin 17.

Figure 2:
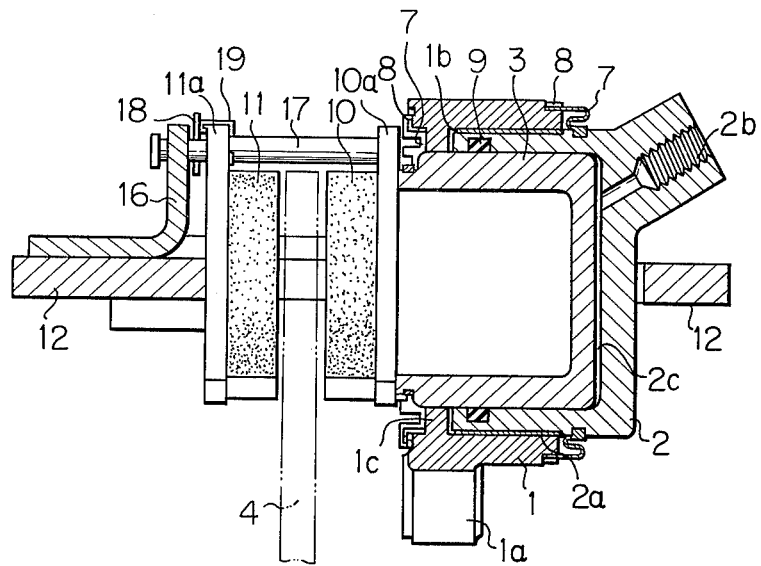
FIG. 2 is a cross-sectional view taken along the line II—II of FIG. 1.
Figure 3:
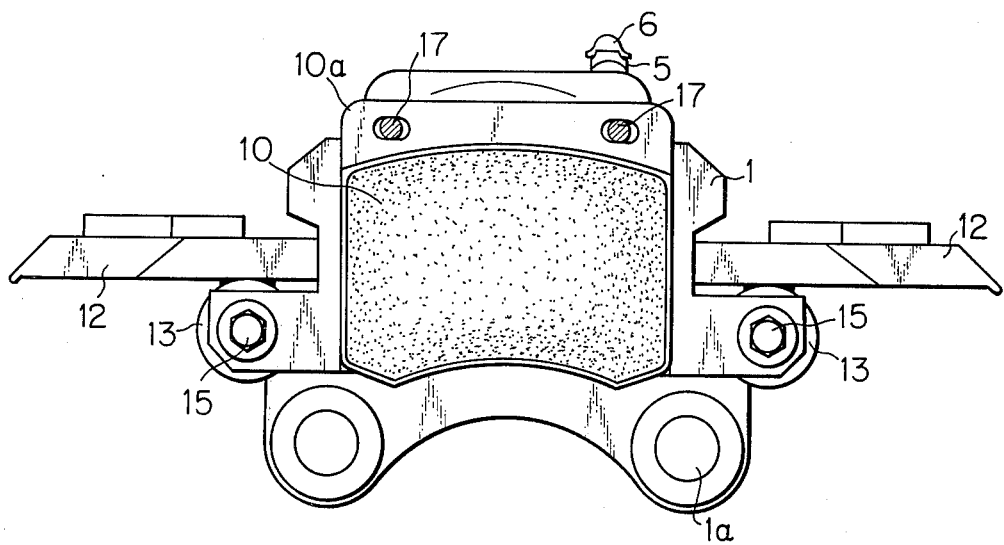
FIG. 3 is a cross-sectional view taken along the line III-III of FIG. 1.

In operation of the disk brake according to the present invention, when pressure oil is introduced through the pressure oil inlet 2b in the cylinder 2, into the space defined by the bottom surface 2c of the cylinder and one end of the piston 3, the piston 3 will move under the hydraulic pressure to the left, as viewed in FIG. 2, while the cylinder 2 will move to the right. As a result, the seat plate 10a and a friction pad 10 mounted on the other end of the piston 3 will move to the left together with the piston 3, thereby urging the disk 4 from the right side. On the other hand, the cylinder 2 will move to the right, whereupon the seat plate 11a and friction pad 11 coupled through the guide pin 17 to the cylinder 2 will move to the right to urge the disk 4 from the left side thereof, thereby effecting normal braking action in cooperation with the friction pad 10.

The disk brake according to the present invention achieves the same braking effect as that of the prior art disk brake, but it eliminates the need to place two pistons in opposing relation to each other. Instead it uses a single piston which is adapted to operate a pair of friction pads, so that the dimensions of the disk brake may be materially reduced in the direction at a right angle to the disk. Accordingly, the disk brake according to the present invention is easier to install on a vehicle, costs less to produce and has the additional advantage of improved rigidity of the yoke.

Further, the so-called "knockback phenomenon" — pushing back of piston 3 due to the whirling of the disk 4 — is reduced to a great extent due to the reduced frictional resistance in the sliding contact portions of the cylinder and housing due to the lubricity of bushing 2a made of polytetrafluoroethylene and due to the increase in return resistance due to the oil seal 9 provided between the piston 3 and the cylinder 2. The piston and cylinder may follow the axial deflection of the disk in an integral fashion, thereby reducing the knock back phenomenon substantially.

According to the present invention, a single piston is used in place of the two pistons used in the conventional disk brake, so that the disk brake according to the present invention is light in weight and has a high resistance to vibration.

In addition, in the disk brake according to the present invention there is little or no sticking of the friction pads. In the conventional disk brake, the friction pads do not always wear evenly, and sometimes they wear unevenly. In this case, because a distortion is exerted on the piston in the direction at a right angle to the sliding direction thereof, coupled with the fact that the fitting length of the piston and the cylinder in the conventional disk brake is short, it often happens that the piston is apt to stick or bind in the cylinder. In contrast, according to the present invention, the piston 3 is guided not only by the inner wall of the cylinder 2 but also by the small diameter portion 1c in the housing 1, so that a length sufficient to fit may be achieved, thus eliminating the possibility of inoperable condition due to sticking or binding of the piston.

What is claimed is:

1. A disk brake comprising:
   a housing affixed to a non-rotatable member and having a through-hole therein;
   said through-hole having a large diameter portion and small diameter portion, said large diameter portion being of a greater length than said small diameter portion;
   a cylinder slidingly fitted in the large diameter portion of said through-hole and having a pressure fluid inlet;
   a piston having an outer surface of uniform diameter throughout the length thereof fitted within and in sliding contact with said cylinder and said small diameter portion of said through-hole;
   said cylinder and piston defining therebetween single chamber means for receiving fluid through said inlet and for moving said cylinder and piston longitudinally with respect to each other;
   a disk rotatable together with a rotating member;
   a yoke affixed to said cylinder and movable with said cylinder;
   means for coupling said yoke to said housing in a movable manner;
   a first friction pad supported by said yoke and adapted to be urged against or detached from a first side of said disk; and
   a second friction pad mounted on one end of said piston and adapted to be urged against or detached from a second side of said disk.

2. A disk brake as claimed in claim 1, wherein said means coupling said yoke to said housing comprises a pair of collars affixed on said yoke and a pair of guide pins affixed on said housing, said guide pins being slidably inserted into respective of said collars.

3. A disk brake as claimed in claim 1, wherein said means coupling said yoke to said housing comprises a pair of collars affixed on said yoke, a pair of grippers inserted into respective of said collars, and a pair of guide pins slidably inserted into respective of said grippers.

4. A disk brake as claimed in claim 1, further comprising a bushing made of a material having good lubricity fitted between the relative sliding portions of said cylinder and said housing.

* * * * *